United States Patent [19]
Downs

[11] Patent Number: 4,595,369
[45] Date of Patent: Jun. 17, 1986

[54] EDUCATIONAL AND AMUSEMENT DEVICE

[76] Inventor: Arthur R. Downs, 1509 Hodges Ferry Rd., Portsmouth, Va. 23701

[21] Appl. No.: 709,892

[22] Filed: Mar. 8, 1985

[51] Int. Cl.⁴ ............................................. G09B 23/08
[52] U.S. Cl. .................................... 434/302; 273/109; 446/170; 446/431; 446/437
[58] Field of Search ............... 434/139, 140, 278, 281, 434/302; 446/168, 170, 171, 173, 431; 273/109

[56] References Cited

U.S. PATENT DOCUMENTS

| | | | |
|---|---|---|---|
| 2,890,537 | 6/1959 | Benko | 434/140 X |
| 3,028,704 | 4/1962 | Rumbaugh | 446/168 |
| 3,204,964 | 9/1965 | Geary | 434/140 X |
| 3,317,209 | 5/1967 | Dixon | 434/281 X |
| 3,610,624 | 10/1971 | Fleischer | 446/170 X |
| 3,768,810 | 10/1973 | Goldfarb | 446/168 X |
| 4,394,016 | 7/1983 | Manos | 446/168 X |

Primary Examiner—Harland S. Skogquist

[57] ABSTRACT

Rounded moveable members such as a ball are directed in two established and independent lengths of transparent tubing which are arranged within a transparent sphere. The rounded moveable members such as a ball have a diameter smaller than the inside diameter of the transparent tubing thus the rounded moveable members such as a ball follow a path that gives a spinning motion. The spinning motion for the first path will be directed by the tubing secured to the inside of the transparent sphere from top to bottom. Thus the first path follows the curvature of the sphere from top to bottom. The second path is directed by the transparent tubing arranged in a cylindrical spiral about the center of the sphere which allows the rounded moveable member such as a ball to follow a cylindrical spiral path from top to bottom of the sphere. The length of tubing about the center of the sphere that is arranged in a cylindrical spiral is supported by a transparent cylinder that is secured by the transparent sphere.

1 Claim, 3 Drawing Figures

EDUCATIONAL AND AMUSEMENT DEVICE

FIELD OF INVENTION

This invention relates to educational and amusement devices which provide for the observation of the motion of one body with respect to another body as a consequence of gravitational forces acting on rounded moveable members, such as balls, which move along established paths of travel. More particularly, the invention relates to amusement devices in which rounded moveable members, such as balls, are directed along two established and independent lengths of transparent tubing which are arranged within a transparent sphere.

DESCRIPTION OF PRIOR ART

Prior devices are known in which the motion of balls along directed paths, (typically fixed transparent tubes), are used as educational and amusement attractions. However, in many such prior devices the transparent tubes are physically exposed and can be easily damaged when used by young children.

In many prior devices it is not possible to watch the relative motion of two different balls along independent paths. Additionally, there is typically a "base" for such devices which dictates an inherent "upright" position in which the device is normally oriented. Also, prior devices do not provide for the observation of relative motion between balls directed along a cylindrical helix and along a spherical helix.

SUMMARY OF THE INVENTION

It is an object of the invention to provide a transparent sphere which encloses two independent lengths of transparent tubing, each containing a moveable ball.

It is another object of the present invention to provide a device of the character described that is a safe and clean toy.

It is another object of the present invention to provide a device of the character described in which the balls inside of the independent lengths of transparent tubing can be moved from one end to the other by the force of gravity.

It is another object of the present invention to provide a device of the character described in which one length of transparent tubing effects a cylindrical-helical path from the "top" to the "bottom" of the transparent sphere and a second length of transparent tubing effects a spherical-helical path from the "top" to the "bottom" of the circumference of the transparent sphere.

It is another object of the present invention to provide a device of the character described in which the balls can be caused to move by turning the sphere from "top" to "bottom".

It is another object of the present invention to provide a device of the character described in which the independent motion of the two balls can be observed relative to each other.

It is another object of the present invention to provide a device of the character described which is an educational device.

Further objects and advantages of my invention will become apparent from a consideration of the drawings and ensuing description thereof.

DESCRIPTION OF THE PREFERRED EMBODIMENT

Figure 1:
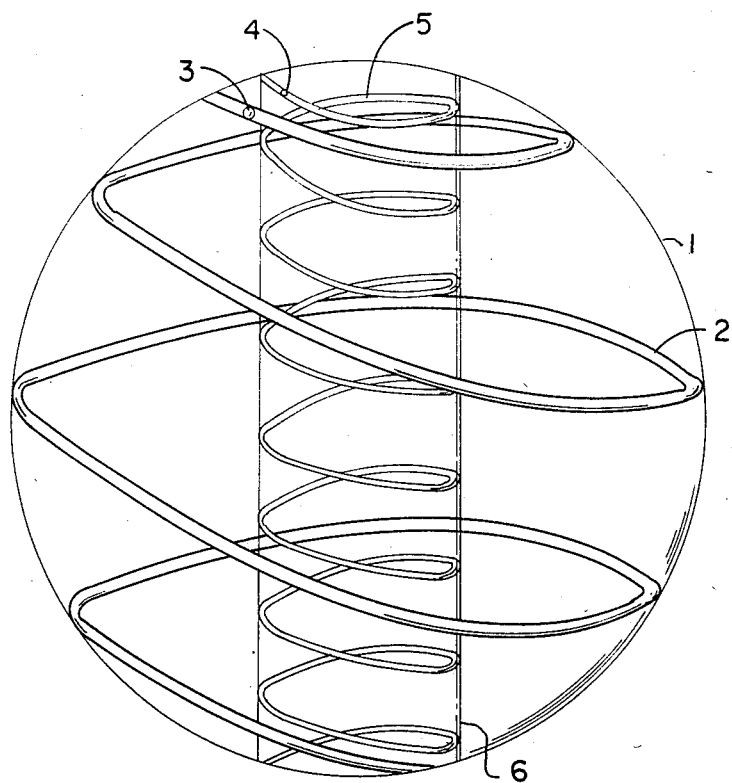
FIG. 1 is a perspective view of the present invention.
Figure 2:
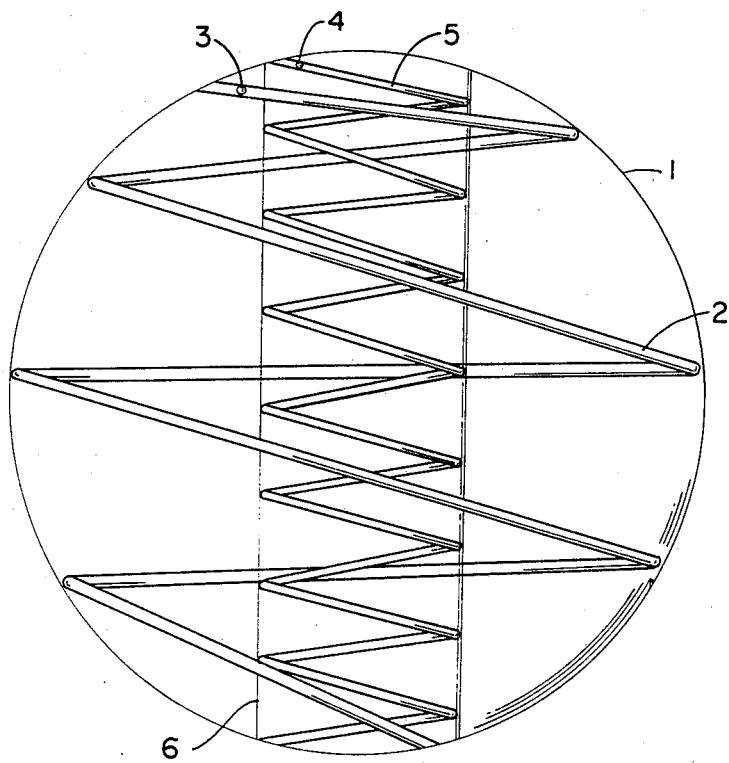
FIG. 2 is an elevation view of the present invention.
Figure 3:
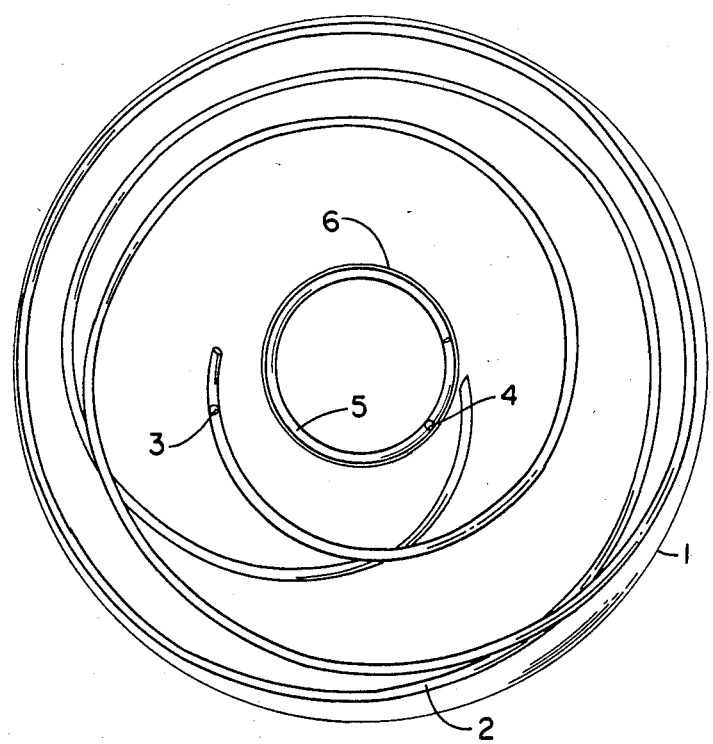
FIG. 3 is a plan view of the present invention.

As shown in the drawings, in the preferred embodiment of the invention a hollow transparent sphere (1) encloses a transparent tube (2). Transparent tube (2) is attached to the inside surface of transparent sphere (1).

A transparent cylindrical support (6) whose axis passes through the center of transparent sphere (1) is located inside of the transparent sphere (1). The transparent cylindrical support (6) is attached at its ends to the inside surface of transparent sphere (1).

A transparent tubing (5) having a cylindrical helix configuration whose axis is concidental with the axis of the transparent cylindrical support (6) is attached to the transparent cylindrical support (6). Transparent tubing (5) extends from one end of transparent cylindrical support (6) to the other.

The two ends of transparent tubing (2) are attached to the inside surface of transparent sphere (1) near the two ends respectively, of transparent cylindrical support (6). Transparent tubing (2) extends along the inside surface of transparent sphere (1) in a number of convolutions thus effecting a spherical-helix configuration whose axis is coincidental with the axis of the cylindrical helix described by transparent tubing (5).

Within the transparent tubing (5) is a rounded moveable member such as a ball (4) which travels within the tubing due to the force of gravity when the axis of the cylindrical helix described by the transparent tubing (5) is in a generally vertical orientation.

Within the transparent tubing (2) is a rounded moveable member such as a ball (3) which travels within the tubing due to the force of gravity when the axis of the convolutions of transparent tubing (2) is in a generally vertical orientation.

The present invention can be turned from "top" to "bottom" by children using the device whose interest may be attracted by the spiralling downward motion of balls (4) and (3) relative to each other. Specifically, the motion of ball (4) through the cylindrical helix path directed by transparent tubing (5) may be observed relative to the motion of ball (3) as it travels through its spherical-helix path as directed by the configuration of transparent tubing (2). This observation of motion of one body with respect to another moving body is educational as it shows like motion proceeding independently of each other.

The embodiment that is described by this invention as shown in the drawings is intended for illustration and does not limit modifications to these drawings that do not depart from the spirit of the invention. Accordingly, the scope of the invention should be determined not by the embodiment illustrated, but by the appended claims and their legal equivalents.

I claim:
1. An amusement device comprising:
   a hollow transparent sphere;
   a first length of transparent tubing;
   a second length of transparent tubing;
   a transparent cylinder;
   said transparent cylinder being disposed within said transparent sphere, the axis of said transparent cylinder passing through the center of said transparent sphere, and each end of said transparent cylinder being attached to the inside surface of said transparent sphere;

the ends of said first length of transparent tubing being attached to the two ends, respectively, of said transparent cylinder;

said first length of transparent tubing being configured in a cylindrical helix, the axis of said cylindrical helix being coincidental with said axis of said transparent cylinder; an intermediate section of said first length of transparent tubing being attached to said transparent cylinder at an intermediate point along the length of said transparent cylinder;

the ends of said second length of transparent tubing being attached to the inside surface of said hollow transparent sphere adjacent to the two ends, respectively, of said transparent cylinder;

said second length of transparent tubing being configured in a spherical helix, the axis of said spherical helix being coincidental with said axis of said transparent cylinder; an intermediate section of said second length of transparent tubing being attached to the inside surface of said hollow transparent sphere;

a first moveable member disposed within said first length of transparent tubing; said first moveable member having a convex periphery and having a maximum cross-sectional dimension less than the inside diameter of said second length of transparent tubing; and a second moveable member disposed within second length of transparent tubing; said second moveable member having a convex periphery and having a maximum cross-sectional demension less than the inside diameter of said second length of transparent tubing.

* * * * *